US011532031B2

(12) United States Patent
Senthil (10) Patent No.: US 11,532,031 B2
(45) Date of Patent: Dec. 20, 2022

(54) SYSTEM AND METHOD FOR POPULATING WEB-BASED FORMS AND MANAGING E-COMMERCE CHECKOUT PROCESS

(71) Applicant: 1ClickPay Inc, Sammamish, WA (US)

(72) Inventor: Kumar N Senthil, Sammamish, WA (US)

(73) Assignee: 1ClickPay Inc, Sammamish, WA (US)

( * ) Notice: Subject to any disclaimer, the term of this patent is extended or adjusted under 35 U.S.C. 154(b) by 142 days.

(21) Appl. No.: 17/144,178

(22) Filed: Jan. 8, 2021

(65) Prior Publication Data
US 2022/0222735 A1 Jul. 14, 2022

(51) Int. Cl.
*G06Q 30/06* (2012.01)
*G06F 40/174* (2020.01)
*G06F 16/951* (2019.01)
*H04L 67/1396* (2022.01)
*G06F 40/194* (2020.01)

(52) U.S. Cl.
CPC ....... *G06Q 30/0637* (2013.01); *G06F 16/951* (2019.01); *G06F 40/174* (2020.01); *G06Q 30/0635* (2013.01); *G06Q 30/0643* (2013.01); *H04L 67/1396* (2022.05); *G06F 40/194* (2020.01)

(58) Field of Classification Search
CPC ........... G06Q 30/0637; G06Q 30/0635; G06Q 30/0643; G06F 16/951; G06F 40/174; G06F 40/194; H04L 67/1396
See application file for complete search history.

(56) References Cited

U.S. PATENT DOCUMENTS

| 6,192,380 | B1 | 2/2001 | Light et al. |
| 6,662,340 | B2 | 12/2003 | Rawat et al. |
| 2008/0120257 | A1 | 5/2008 | Goyal et al. |
| 2012/0023011 | A1* | 1/2012 | Hurwitz ................. G06Q 20/10 705/39 |
| 2012/0047121 | A1* | 2/2012 | Canel .................... G06F 16/951 707/711 |
| 2014/0188668 | A1 | 7/2014 | Brabec et al. |
| 2014/0207624 | A1 | 7/2014 | Balasubramanian et al. |
| 2015/0088695 | A1 | 3/2015 | Lorbiecki et al. |
| 2021/0174428 | A1* | 6/2021 | Isaacson ............. G06Q 20/405 |

FOREIGN PATENT DOCUMENTS

WO     2020165531 A1    8/2020

* cited by examiner

*Primary Examiner* — Michael A Keller
(74) *Attorney, Agent, or Firm* — Jason C. Cameron (57) ABSTRACT

A system for populating web-based form and managing e-commerce checkout process is disclosed. Combined with the data mapping to user profile, the checkout workflow should be able to make all of the necessary calls on behalf of the user to perform checkout completely. The system performs user authentication to ensure that the user profile is accessed only by the authorized user. During run-time, the program adds the product to cart, and load the checkout pages on behalf of the user, remembers the states such as the cookies and CSRF tokens and performs the form filling using their user profile data. The system makes one or more server calls to the e-commerce website from at least one of the servers or a browser in one click based on filled we-based form to complete a checkout process.

17 Claims, 7 Drawing Sheets

SYSTEM AND METHOD FOR POPULATING WEB-BASED FORMS AND MANAGING E-COMMERCE CHECKOUT PROCESS

FIELD OF INVENTION

Embodiments of the present disclosure relation to art of e-commerce, and more particularly to, a system and a method for populating web-based form in one click and managing e-commerce checkout process.

BACKGROUND

A web-based form is a page on a website that allows an organization to retrieve digital objects (administrative records, plans, maps, invoices, video-grams, telephone records, personal data or the like). To make it easier to enter order or registration forms over the Internet, web browsers provide an autofill feature. In practice, when we insert digital objects in an online form, browsers offer to save them. Then, the pre-recorded digital objects are used to fill out new forms elsewhere on the Internet. However, despite the appreciable saving of time, such a functionality can pose serious security problems with respect to digital objects. Indeed, without the user's consent, a malicious person can recover these digital objects. Sometimes, the file is encrypted using encryption functions present on the computer where the web browser is installed. In some cases when the customers are shopping, they will need to go each individual website and add items to cart, fill out the checkout fields or it could be auto filled by the browser, deal with the nuances involved in the payment methods, shipping methods or the like. Such process is a very time consuming, error prone and frustrating process for consumers.

In view of the risks incurred by the organizations that operate the websites, a solution is be proposed that allows them to save time in filling out online forms and to preserve the security of digital objects belonging to Internet users. In one such case, system constitutes a personal information space which stores the digital objects of the Internet user. This personal information space is then used to assist the Internet user in completing an online form for a web page. However, such an approach requires the user to pre-fill the personal information space with all of its digital objects. In addition, in case of a security issue, the computer on which the personal information space is stored, all of the internet user's digital objects will be exposed.

In one scenario after the form filling the consumers may complete the e-commerce transaction using a checkout procedure provided by the e-commerce website. In some instances, network servers associated with the e-commerce website may experience heavy network traffic. Such network traffic may exceed the capacity of the network servers to service the network traffic, thereby possibly resulting in a failure or crash of the website during the checkout process.

Hence, there is a need for an improved system and method for populating web-based form in a secure manner and mange e-commerce checkout process with the failure to address the aforementioned issue(s).

BRIEF DESCRIPTION

In accordance with an embodiment of the present disclosure, a system for populating web-based form and managing e-commerce checkout process is provided. The system includes a user interface and an application programming interface configured to enable communication with one or more e-commerce websites. The system also includes a processing subsystem hosted on a server and configured to execute on a network to control bidirectional communications among a plurality of modules. The processing subsystem includes a data collection module configured to collect signature corresponding to one or more web-based forms from the one or more e-commerce websites. The data collection module is also configured to collect products information, user profile data and one or more user preferences corresponding to product to be purchased, shipping preferences, payment preferences. The processing subsystem also includes a change detection module configured to detect one or more changes in the signature of the one or more web-based forms by continuously monitoring the corresponding one or more e-commerce websites using a web crawler. The processing subsystem further includes a signature collection module configured to store signature collected by the data collection module and changed signature detected by the change detection module to produce one or more aggregated fields. The processing subsystem further includes a form filing module configured to parse artifacts and cookies of one or more fields corresponding to a web-based form located on an e-commerce website based on a user preference using the one or more aggregated fields. The form filing module is also configured to map the one or more fields associated with the web-based form with the user profile data using a classifier data mapping process. The form filing module is further configured to fill the web-based form upon mapping using a fuzzy logic cognitive mapping technique. The processing subsystem further includes a checkout processing module configured to make one or more server calls to the e-commerce website from at least one of the servers or a browser based on filled web-based form to complete a checkout process.

In accordance with another embodiment of the present disclosure, a method for populating web-based form and managing e-commerce checkout process is provided. The method includes enabling, by a user interface and an application programming interface, communication with one or more e-commerce websites. The method also includes executing, by a processing subsystem hosted on a server, on a network to control bidirectional communications among a plurality of modules. The method further includes collecting, by a data collection module, signature corresponding to one or more web-based forms from the one or more e-commerce websites. The method further includes collecting, by the data collection module, products information, user profile data and one or more user preferences corresponding to product to be purchased, shipping preferences, payment preferences. The method further includes detecting, by a change detection module, one or more changes in the signature of the one or more web-based forms by continuously monitoring the corresponding one or more e-commerce websites using a web crawler. The method further includes storing, by a signature collection module, signature collected by the data collection module and changed signature detected by the change detection module to produce one or more aggregated fields. The method further includes parsing, by a form filing module, artifacts and cookies of one or more fields corresponding to a web-based form located on an e-commerce website based on a user preference using the one or more aggregated fields. The method further includes mapping, by the form filing module, the one or more fields associated with the web-based form with the user profile data using a classifier data mapping process. The method further includes filling, by the form filing module, the web-based form upon mapping using a fuzzy logic cognitive mapping technique. The method further includes making, by a checkout processing module, one or more server calls to the e-commerce website from at least one of the server or a browser in one click based on filled we-based form to complete a checkout process.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for populating web-based form in one click and managing e-commerce checkout process. The system includes a user interface and an application programming interface configured to enable communication with one or more e-commerce websites. The system also includes a processing subsystem hosted on a server and configured to execute on a network to control bidirectional communications among a plurality of modules. The processing subsystem includes a data collection module configured to collect signature corresponding to one or more web-based forms from the one or more e-commerce websites. The data collection module is also configured to collect products information, user profile data and one or more user preferences corresponding to product to be purchased, shipping preferences, payment preferences. The processing subsystem also includes a change detection module configured to detect one or more changes in the signature of the one or more web-based forms by continuously monitoring the corresponding one or more e-commerce websites using a web crawler. The processing subsystem further includes a signature collection module configured to store signature collected by the data collection module and changed signature detected by the change detection module to produce one or more aggregated fields. The processing subsystem further includes a form filing module configured to parse artifacts and cookies of one or more fields corresponding to a web-based form located on an e-commerce website based on a user preference using the one or more aggregated fields. The form filing module is also configured to map the one or more fields associated with the web-based form with the user profile data using a classifier data mapping process. The form filing module is further configured to fill the web-based form upon mapping using a fuzzy logic cognitive mapping technique. The processing subsystem further includes a checkout processing module configured to make one or more server calls to the e-commerce website from at least one of the servers or a browser based on filled web-based form to complete a checkout process.

Figure 1:
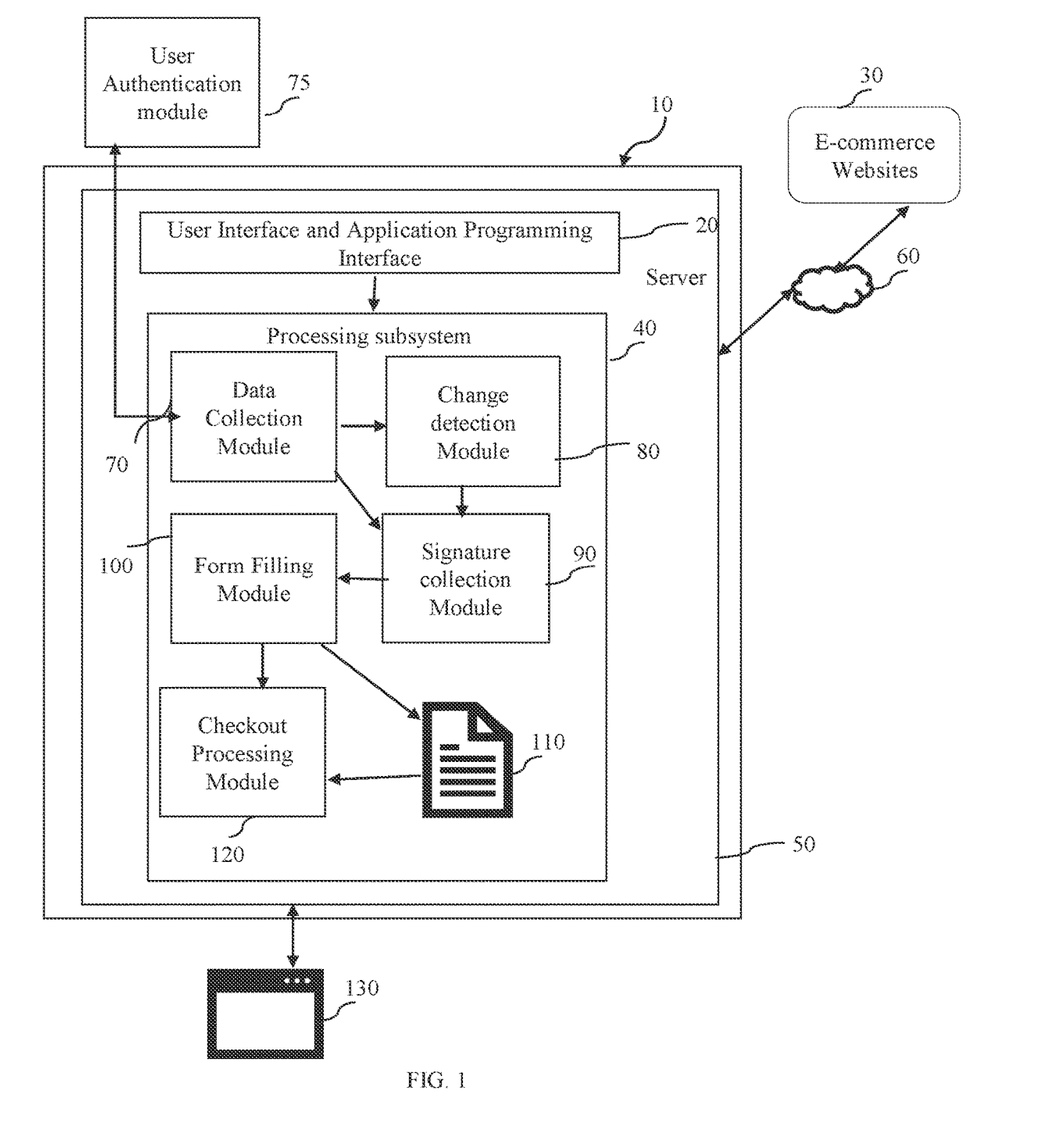
FIG. 1 is a block diagram representation of system for populating web-based form in one click and managing e-commerce checkout process in accordance with an embodiment of the present disclosure.

FIG. 1 is a block diagram representation of system 10 for populating web-based form in one click and managing e-commerce checkout process in accordance with an embodiment of the present disclosure. The system 10 includes a user interface (UI) and an application programming interface 20 configured to enable communication with one or more e-commerce websites 30. As used herein, the e-commerce website is a site that sells products and services through means of the data transfer and funds over the internet. As used herein, UI and the application programming interface (API) is a computing interface that defines interactions between multiple software intermediaries. The API defines the kinds of calls or requests which may be made, how to make them, the data formats that should be used, the conventions to follow, or the like. In one embodiment, the API may be remote APIs or web APIs. The remote APIs allow to manipulate remote resources through protocols, specific standards for communication that further allow different technologies to work together, regardless of language or platform. The web APIs are the defined interfaces through which interactions happen between an enterprise and applications that use its assets, which also is a Service Level Agreement (SLA) to specify the functional provider and expose the service path or URL for its API users.

The system 10 also includes a processing subsystem 40 hosted on a server 50. In one embodiment, the server 50 may be a cloud-based server. In another embodiment, parts of the server 50 may be a local server coupled to a user device. The processing subsystem 40 is configured to execute on a network 60 to control bidirectional communications among a plurality of modules. In one embodiment, the network 60 may include one or more terrestrial and/or satellite networks interconnected to communicatively connect the user device to web server engine and data collection module. In one example, the network 60 may be a private or public local area network (LAN) or Wide Area Network (WAN), such as the Internet. In another embodiment, the network 60 may include both wired and wireless communications according to one or more standards and/or via one or more transport mediums. In one example, the network 60 may include wireless communications according to one of the 802.11 or Bluetooth specification sets, or another standard or proprietary wireless communication protocol. In yet another embodiment, the network 60 may also include communications over a terrestrial cellular network, including, a GSM (global system for mobile communications), CDMA (code division multiple access), and/or EDGE (enhanced data for global evolution) network.

The processing subsystem 40 includes a data collection module 70 configured to collect signature corresponding to one or more web-based forms from the one or more e-commerce websites. The signatures are collected by collecting name of each checkout fields such as customer name, email, phone, payment info, billing address, shipping address, shipping methods, special instructions, special cookies, supported user agent or the like. The field name for each website may be different for each website and the number of fields also may be different for each website. As used herein, the webform, web form or HTML form on a web page allows a user to enter data that is sent to a server for processing. The webforms may resemble paper or database forms because web users fill out the forms using checkboxes, radio buttons, or text fields. For example, forms can be used to enter shipping or credit card data to order a product or can be used to retrieve search results from a search engine. The data collection module 70 is also configured to collect products information, user profile data and one or more user preferences corresponding to product to be purchased. In one embodiment, the data collection module is configured to add the product to cart and load a checkout page on behalf of the user. As used herein, the product information refers to the product name, product size, product brand or the like which are added into cart to purchase. As used herein, the user profile is a visual display of personal data associated with a specific user, or a customized desktop or mobile environment. A profile refers therefore to the explicit digital representation of a person's identity. The user profile is a structure that is used to capture certain characteristics about an individual user, and the process of obtaining the user profile is called user modeling or profiling. The user profile may be used to store the description of the characteristics of a person. This information can be used by systems taking into account the person's characteristics and preferences. The user authentication module 75 may use a biometric or other forms of secure authentication mechanisms to ensure only the user profile is accessed only by authorized user. The user authentication module 75 may be located outside the system 10 to validate the credentials of the user.

The processing subsystem 40 also includes a change detection module 80 configured to detect one or more changes in the signature of the one or more web-based forms by continuously monitoring the corresponding one or more e-commerce websites using a web crawler. More specifically, the change detection may be segregated into two main subdomains. The first branch is server-side change detection, and the other is client-side change detection. The server-side change detection uses servers that poll webpages, track changes, and notify them to users. The client-side change detection makes the client-side infrastructure poll the webpages, and track changes on their own. The change detection module 80 obtains versions of webpages by crawling them and saving the data to version repositories. These data are saved in an unstructured manner, mostly in the format of documents with tags, to allow easy storage and retrieval. Then, changes are detected by comparing a previously saved version with the latest version of a particular webpage using similarity computations. The majority of the change detection mechanisms convert the data of a saved version into an XML-like format where an element represents opening and closing HTML tags.

The processing subsystem 40 further includes a signature collection module 90 configured to store signature collected by the data collection module and changed signature detected by the change detection module to produce one or more aggregated fields. Once the initial signatures and the signatures that are changed are collected, the signature collection module 90 combines all the signature to identify the one or more aggregated fields and store it in a database. The processing subsystem 40 further includes a form filing module 100 configured to parse artifacts and cookies of one or more fields corresponding to a web-based form 110 located on an e-commerce website based on a user preference using the one or more aggregated fields. In detail, the form filling module parse the html for the form post artifacts and cookies and CSRF tokens. The web page artifacts are one type of Internet browser artifact. Other Internet artifacts include Internet browser history, downloaded files and cookie files. If the device of interest is a mobile device, evidence may also reside in database files such as SQLite files. The cookies are text files with small pieces of data like a username and password that are used to identify your computer as you use a computer network. Specific cookies known as HTTP cookies are used to identify specific users and improve web browsing experience. As used here, the CSRF token is a unique, secret, unpredictable value that is generated by the server-side application and transmitted to the client in such a way that it is included in a subsequent HTTP request made by the client. The client requests an HTML page that contains a form. When the client submits the form, it must send both tokens back to the server. The client sends the cookie token as a cookie, and it sends the form token inside the form data.

The form filing module 100 is also configured to map the one or more fields associated with the web-based form with the user profile data using a classifier data mapping process. The form filing module 100 is further configured to fill the web-based form upon mapping using a fuzzy logic cognitive mapping technique. More specifically, the form filing module uses the classifier data mapping from the user profile data to the form post to create the form post payload. The web uses a client/server architecture where a client (a web browser) sends a request to a server (a web server), using the HTTP and SSL protocol. The payment information is transmitted to 30 in payment card industry (PCI) compliant manner. The server answers the request using the same protocol. The HTML form on a web page is nothing more than a convenient user-friendly way to configure an HTTP request to send data to a server. This enables the user to provide information to be delivered in the HTTP request. The processing subsystem 40 further includes a checkout processing module 120 configured to make one or more server calls to the e-commerce website from at least one of the server 50 or a browser 130 based on filled web-based form to complete a checkout process.

Figure 2:
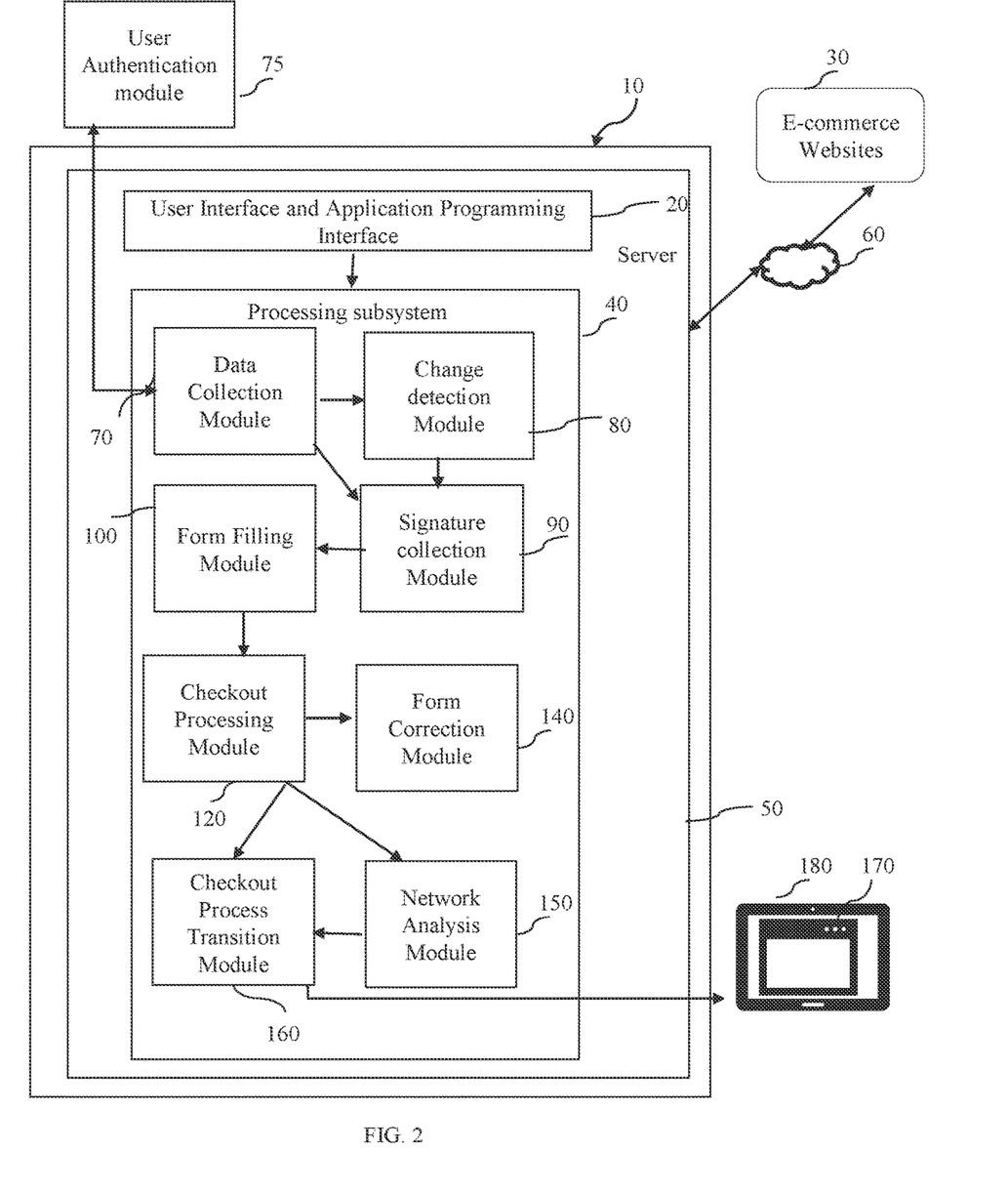
FIG. 2 is a block diagram representation of one embodiment of the system of FIG. 1 in accordance with an embodiment of the present disclosure.

FIG. 2 is a block diagram representation of one embodiment of the system 10 of FIG. 1 in accordance with an embodiment of the present disclosure. The system 10 of FIG. 1 includes a user interface and an application programming interface 20, a processing subsystem 40 including a data collection module 70, a change detection module 80, a signature collection module 90, a form filling module 100 and a checkout processing module 120. In one embodiment, the system 10 of FIG. 1 may include the processing subsystem 40 including a form correction module 140 which is configured to detect one or more changes in a signature of the web based form by logging one or more errors occurred during a form filling process performed by the form filling module. The form correction module 140 is also configured to correct one or more logged errors based on heuristics rules to complete the form filling process. More specifically, the form correction module 140 may detect changes to the e-commerce platform quickly if the form parsing/filling fails on the client server and on the system 10 server side. Such process may be formed in two ways. The first way includes logging the success and error events and store form HTML without the personally identifiable information in a database archive. If the error rate is elevated, the form correction module leverages the form HTML archive to detect the change. The second way includes creating form signatures for each of the one or more e-commerce websites if it is possible. The form correction module calculates the form signatures of a particular e-commerce website continuously and report the change.

In a specific embodiment, the processing subsystem 40 of FIG. 1 may include a network analysis module 150 which is configured to analyze network traffic and network connectivity associated with the one or more e-commerce websites. In detail, network servers of an e-commerce website may experience heavy network traffic due to, for example, a holiday shopping season or a particular promotion (e.g., a limited time offer of a product, a limited time offer at a reduced price, or the like). Such network traffic may, in certain examples, exceed the capacity of the network servers to service the traffic, thereby possibly resulting in a "crash" of the website. The network analysis module 150 may be configured to analyze network traffic associated with a website, such as a website presented by the server. The network analysis module 150 may distribute workload at the website across multiple computing devices so as to provide a single internet service from multiple computing devices. To do so, the network analysis module 150 may monitor the port(s) where the user device connects to access web services and forward, distribute requests to one or more back-end servers or computing devices. In case there is an outage in the e-commerce websites 30 the orders would be resubmitted by the system 10 to the e-commerce websites 30 when the system 10 is able to establish the connection with the e-commerce websites 30.

The processing subsystem 40 includes a checkout process transition module 160 configured to transit the checkout process from the server to an intermediary sub-processing module 170 in a user device when a delay in the network or the connectivity issue between the user device 180 and the server analyzed by the network analysis module. The sub-processing module 170 is substantially equivalent to browser 130 of FIG. 1. The checkout process transition module 160 is also configured to process the checkout process related to the purchase product in the user device 180 to overcome the delay in the network or the connectivity issue. In such an embodiment, the user device 180 may include different portable electronic mobile devices, including but not limited to, cellular phones, personal digital assistants (PDA's), laptop computers, portable gaming devices, portable media players, tablets, e-book readers, watches, as well as non-portable devices such as desktop computers. The user may include one or more input/output devices configured to allow user interaction with one or more programs configured to communicate with the server. In one example, clients run a web browser that accesses and presents a web application executing on the server or another device and allows a user to browse for items and/or services to purchase from the client associated with the website. In another example, clients may execute an application outside of a web browser (e.g., an operating system specific application) that accesses and presents information processed by web server engine 20 or another device.

Figure 3:
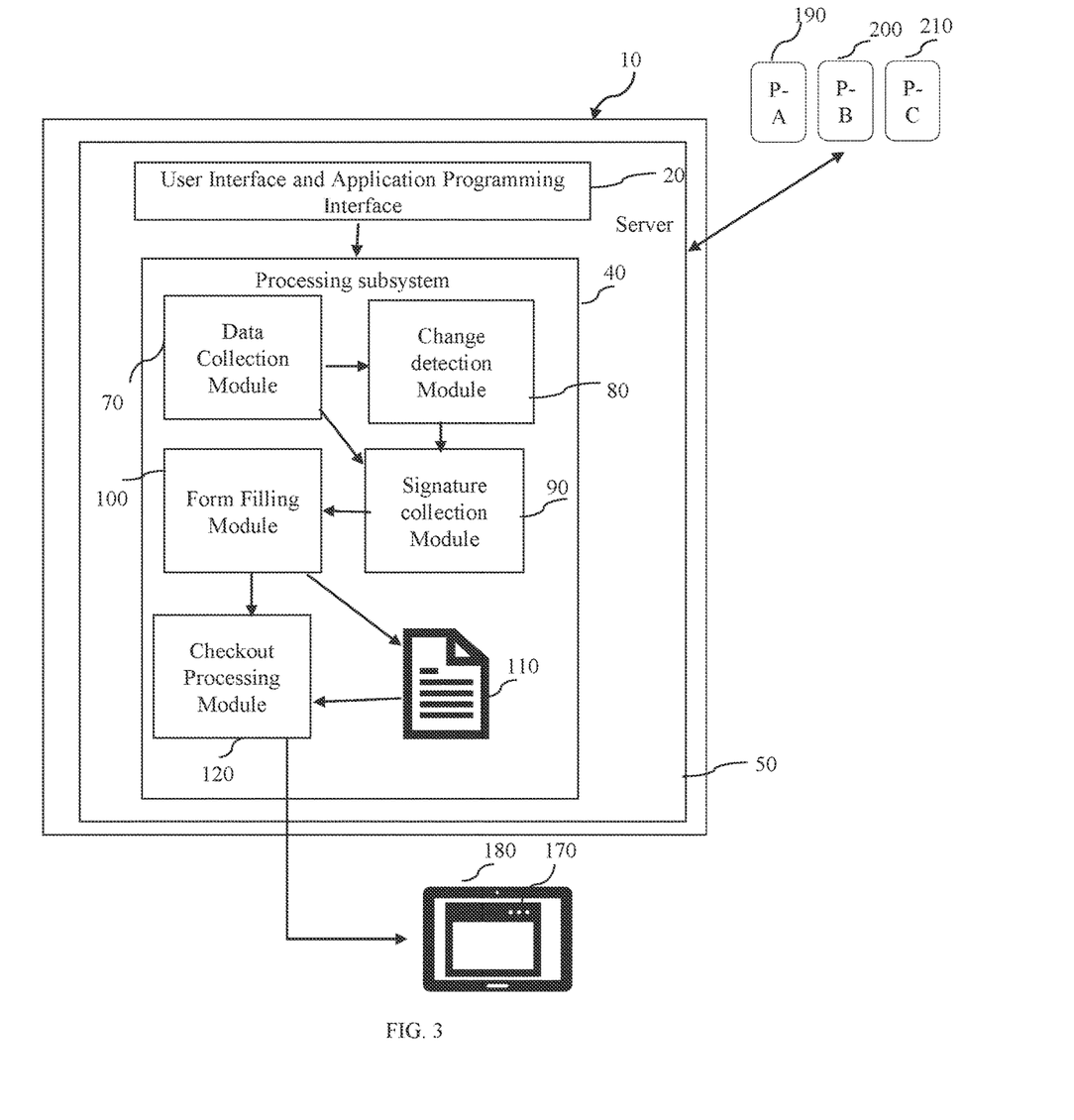
FIG. 3 is a schematic representation of an exemplary system of FIG. 1 in accordance with an embodiment of the present disclosure.

FIG. 3 is a schematic representation of an exemplary system 10 for populating web-based form in one click and managing e-commerce checkout process of FIG. 1 in accordance with an embodiment of the present disclosure. Considering a non-limiting example where the system 10 communicates with three e-commerce websites such as platform-A 190, platform-B 200 and platform-C 210 via a user interface and an application programming interface 20. The processing subsystem 40 of the system 10 is located on a cloud based server 50. However, to avoid network traffic or connectivity issue during checkout process, the server 50 may transit the checkout process on a sub-processing module such as browser 130 of a user device 180. During the backend process, the data collection module 70 collects signatures corresponding to 3 web-based forms from the 3 e-commerce websites such as platform-A 190, platform-B 200 and platform-C 210. The data collection module 70 also obtains the user profile data and the preference of the user. The change detection module 80 obtains versions of webpages by crawling them and saving the data to version repositories and detect the changes by comparing a previously saved version of signature with the latest version of signature of each of the three webpages using similarity computations. Considering that there are changes detected in the platform-B, the signature collection module collects the previous signatures of platform-A and platform-C from the collection module and update the signatures of the platform-B by the signature collection module 90 to create equivalent aggregated fields which may be required to fill the form during the checkout.

Figure 4:
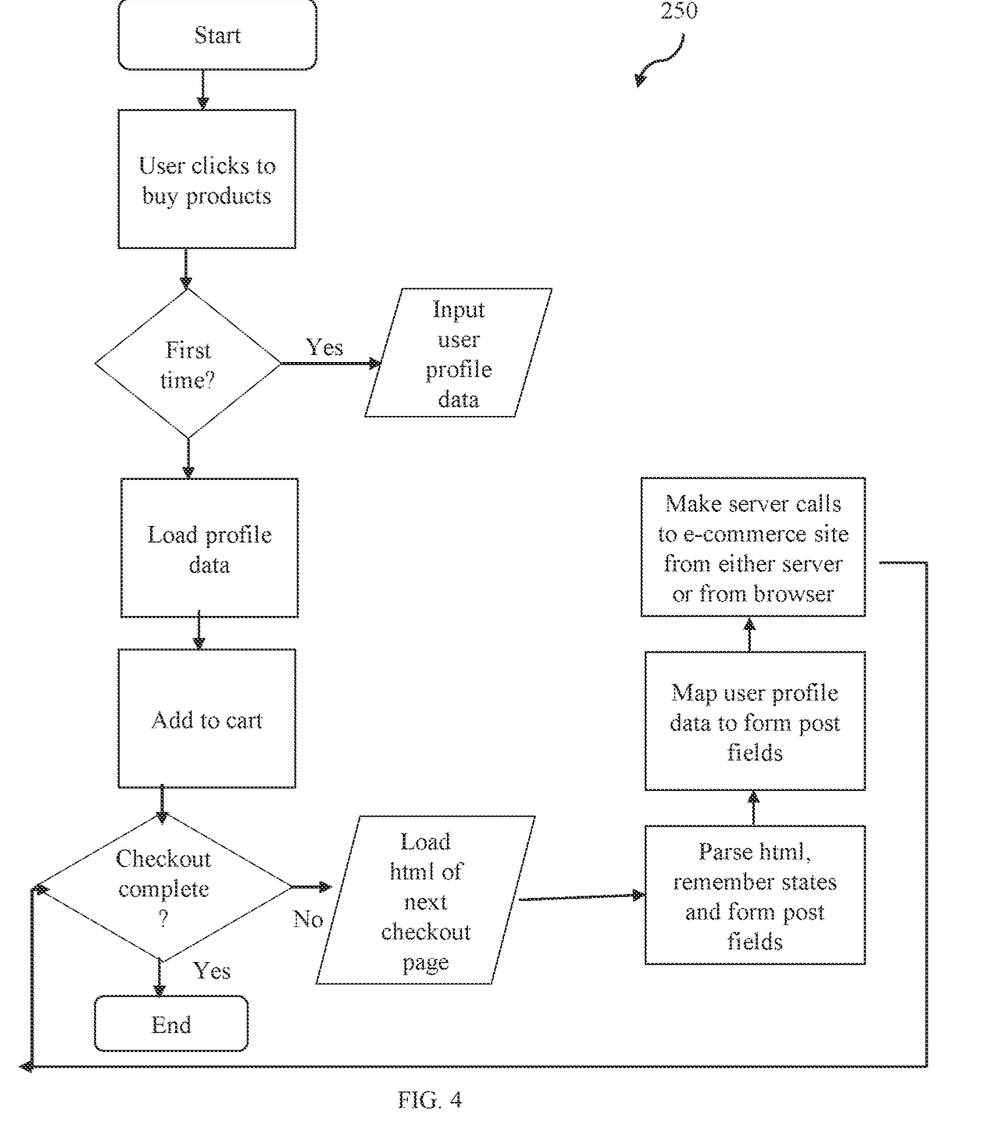
FIG. 4 is a flow chart representing the steps involved in operation of one-click form filling for user run-time of FIG. 3 in accordance with an embodiment of the present disclosure.

During the run-time consider that a user-X has added 2 cosmetic products in the cart and the data collection module 70 collects the product information. Further, the form filing module 100 starts checkout by loading the checkout processing module 120 and identifying the steps necessary. The form filing module loads the html for each step and parse the html for the form post artifacts and cookies. Moreover, the form filing module uses the classifier data mapping from the user profile data to the form post to create the form post payload. More specifically, the parsed artifacts and cookies are corresponding to fields of the web-based form of the website associated with the system 10. The fields of the forms are mapped with the available user profile and filled with the corresponding information such as name, address, contact details, payment details or the like. Consequently, the checkout processing module make the call either from the server or the browser of the user device to complete the checkout process in one click. The checkout processing module repeats until all the steps are completed as shown in the flow chart 250 of FIG. 4. The steps to submit the order could be different for each of the platforms 190, 200 and 210. However, the system described here will obfuscate all those complexities and enable a one-click checkout for the user.

Figure 5:
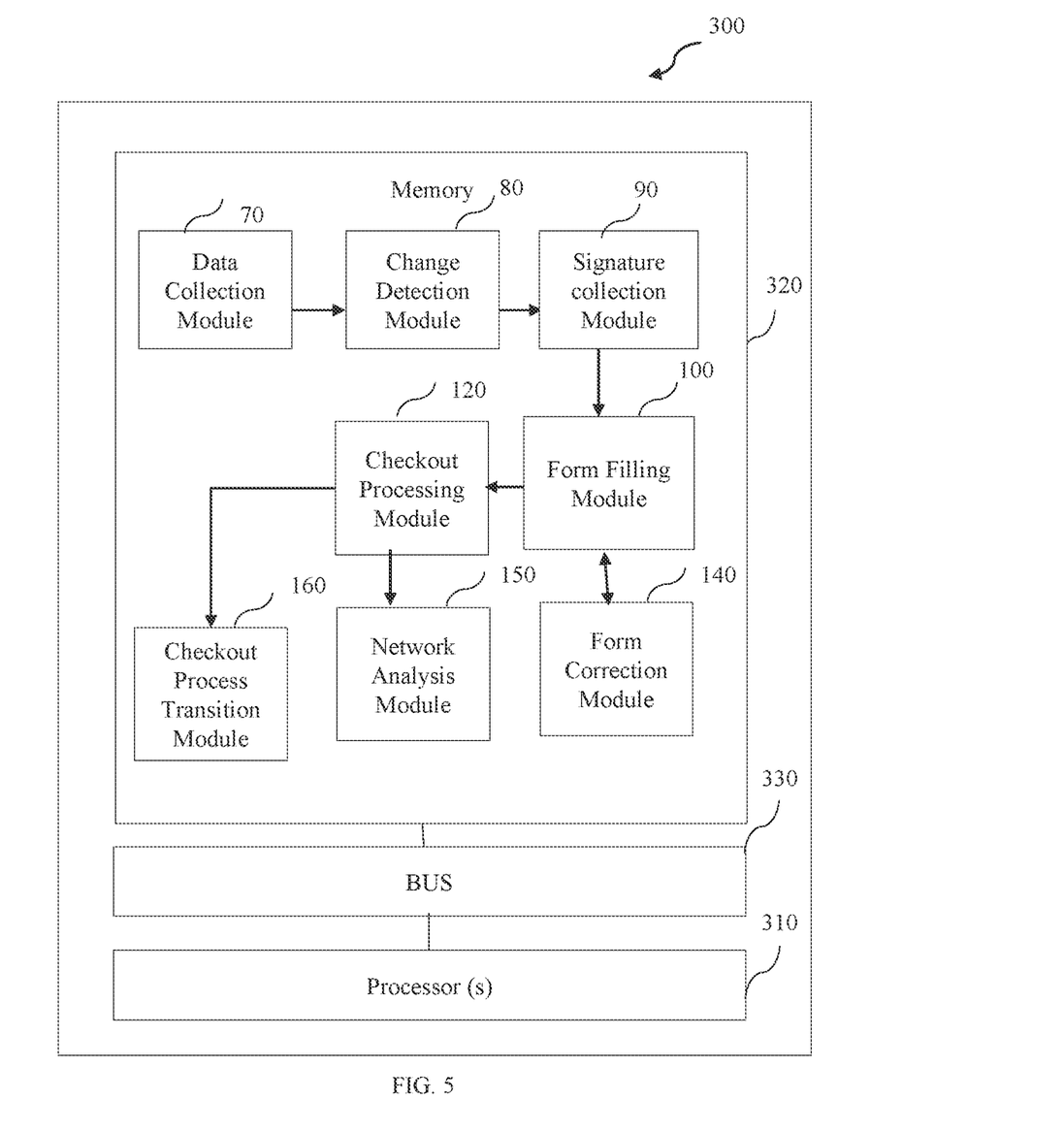
FIG. 5 is a block diagram of a computer or a server for system in accordance with an embodiment of the present disclosure.

FIG. 5 is a block diagram of a computer or a server 300 for system 10 in accordance with an embodiment of the present disclosure. The server includes processor(s) 310, and memory 320 operatively coupled to the bus 330.

The processor(s) 310, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 320 includes a plurality of subsystems and a plurality of modules stored in the form of executable program which instructs the processor 310 to perform the method steps illustrated in FIG. 1. The memory 320 is substantially similar to the system 10 of FIG. 1. The memory 320 has following subsystems: a processing subsystem 40 including a data collection module 70, a change detection module 80, a signature collection module 90, a form filing module 100, a checkout processing module 120, a form correction module 140, a network analysis module 150 and a checkout process transition module 160.

The processing subsystem 40 includes a data collection module configured to collect signature corresponding to one or more web-based forms from the one or more e-commerce websites. The data collection module is also configured to collect products information, user profile data and one or more user preferences corresponding to product to be purchased. The processing subsystem 40 also includes a change detection module configured to detect one or more changes in the signature of the one or more web-based forms by continuously monitoring the corresponding one or more e-commerce websites using a web crawler. The processing subsystem 40 further includes a signature collection module configured to store signature collected by the data collection module and changed signature detected by the change detection module to produce one or more aggregated fields.

The processing subsystem 40 further includes a form filing module configured to parse artifacts and cookies of one or more fields corresponding to a web-based form located on an e-commerce website based on a user preference using the one or more aggregated fields. The form filing module is also configured to map the one or more fields associated with the web-based form with the user profile data using a classifier data mapping process. The form filing module is further configured to fill the web-based form upon mapping using a fuzzy logic cognitive mapping technique. The processing subsystem 40 further includes a checkout processing module configured to make one or more server calls to the e-commerce website from at least one of the server or a browser based on filled web-based form to complete a checkout process.

The processing subsystem 40 includes a form correction module is configured to detect one or more changes in a signature of the web based form by logging one or more errors occurred during a form filling process performed by the form filing module. The form correction module is also configured to correct one or more logged errors based on heuristics rules to complete the form filling process. The processing subsystem 40 further includes a network analysis module configured to analyze network traffic and network connectivity associated with the one or more e-commerce websites. The processing subsystem 40 includes a checkout process transition module configured to transit the checkout process from the server to an intermediary sub-processing module in a user device when a delay in the network or the connectivity issue between the user device and the server analyzed by the network analysis module. The checkout process transition module is also configured to process the checkout process related to the purchase product in the user device to overcome the delay in the network or the connectivity issue.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 310.

Figure 6A:
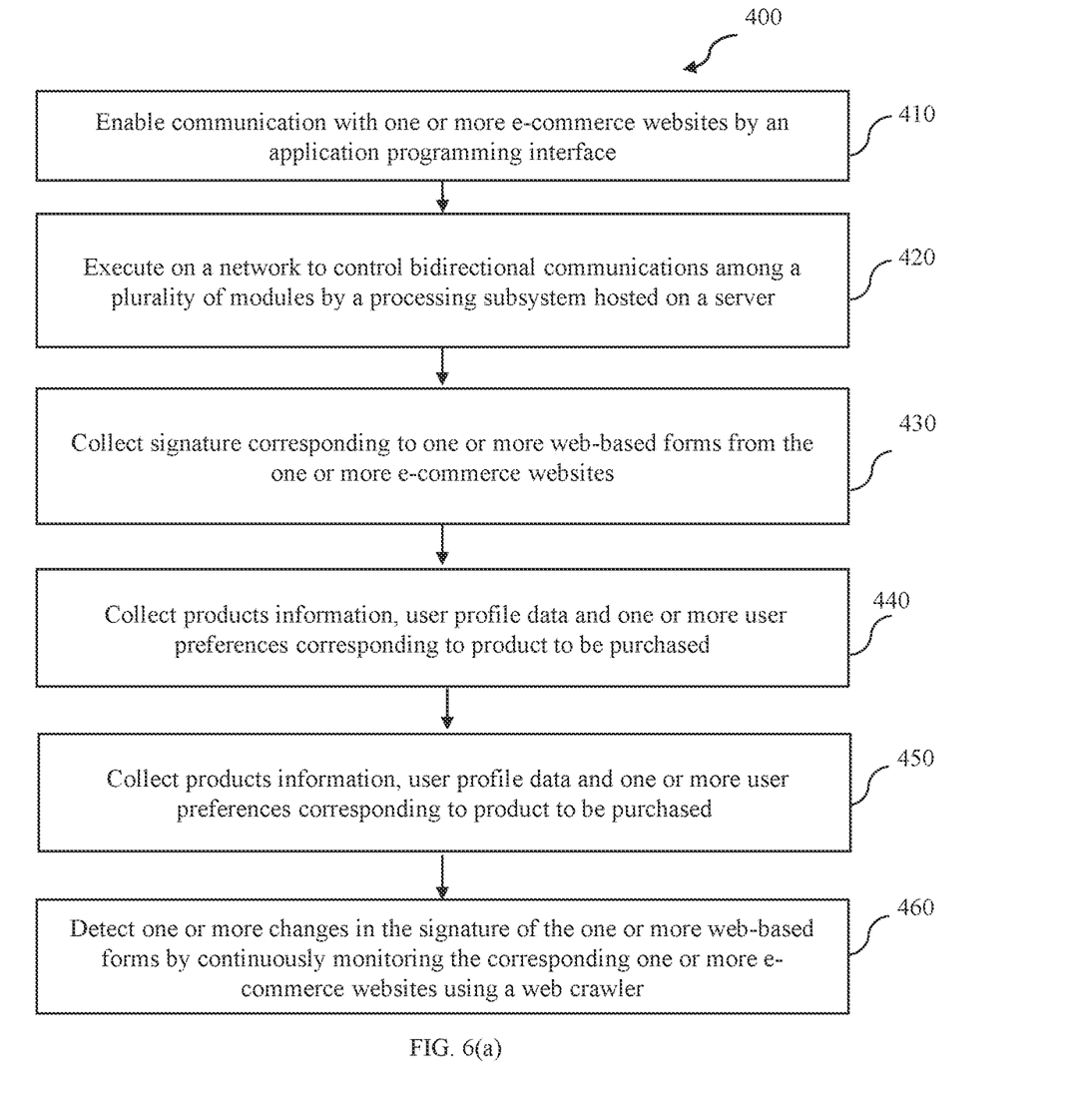
FIG. 6(a) illustrates a flow chart representing the steps involved in a method for populating web-based form in one click and managing e-commerce checkout process in accordance with an embodiment of the present disclosure.
Figure 6B:
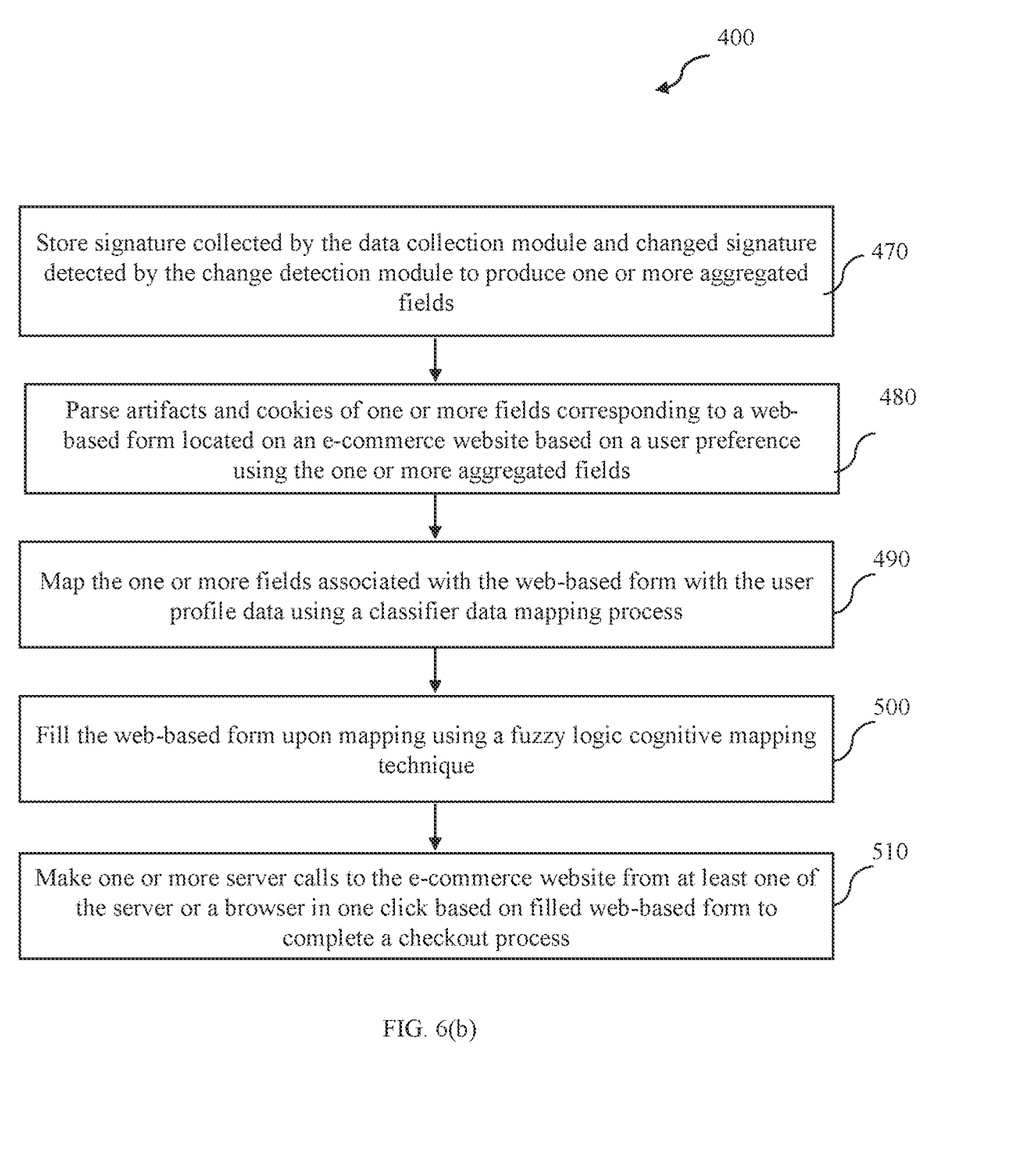
FIG. 6(b) illustrates continued steps of method of FIG. 6(a) in accordance with an embodiment of the present disclosure.

FIGS. 6(*a*) and 6(*b*) is a flow chart representing the steps involved in a method 400 for populating web-based form in one click and managing e-commerce checkout process in accordance with an embodiment of the present disclosure. The method 400 includes enabling communication with one or more e-commerce websites in step 410. In one embodiment, enabling communication with one or more e-commerce websites may include enabling communication with one or more e-commerce websites by an application programming interface. The method 400 further includes executing on a network to control bidirectional communications among a plurality of modules in step 420. In one embodiment, executing on a network may include executing on a network by a processing subsystem hosted on a server. In another embodiment, executing on a network to control bidirectional communications may include executing on a network to control bidirectional communications on a client server through the browser. The browser visits the e-commerce webpage through the network.

The method 400 further includes collecting signature corresponding to one or more web-based forms from the one or more e-commerce websites in step 430. In one embodiment, collecting signature corresponding to one or more web-based forms may include collecting signature corresponding to one or more web-based forms by a data collection module. The method 400 further includes collecting products information, user profile data and one or more user preferences corresponding to product to be purchased in step 440. In one embodiment, collecting products information, user profile data and one or more user preferences may include collecting products information, user profile data and one or more user preferences by the data collection module. In a specific embodiment, the method 400 may include adding the product to cart and load a checkout page on behalf of the user. In such an embodiment, adding the product(s) to cart and loading a checkout page on behalf of the user by the data collection module. The method 400 further includes performing user authentication, by a user authentication module, to ensure that the user profile is accessed only by the authorized user using biometric or other forms of secure authentication mechanism in step 450.

The method 400 further includes detecting one or more changes in the signature of the one or more web-based forms by continuously monitoring the corresponding one or more e-commerce websites using a web crawler in step 460. In one embodiment, detecting one or more changes in the signature of the one or more web-based forms may include detecting one or more changes in the signature of the one or more web-based forms by a change detection module. The method 400 further includes storing signature collected by the data collection module and changed signature detected by the change detection module to produce one or more aggregated fields in step 470. In one embodiment, storing signature collected by the data collection module and changed signature detected by the change detection module to produce one or more aggregated fields may include storing signature collected by the data collection module and changed signature detected by the change detection module to produce one or more aggregated fields by a signature collection module.

The method 400 further includes parsing artifacts and cookies of one or more fields corresponding to a web-based form located on an e-commerce website based on a user preference using the one or more aggregated fields in step 480. In one embodiment, parsing artifacts and cookies of one or more fields corresponding to a web-based form may include parsing artifacts and cookies of one or more fields corresponding to a web-based form by a form filing module. The method 400 further includes mapping the one or more fields associated with the web-based form with the user profile data using a classifier data mapping process in step 490. In one embodiment, mapping the one or more fields associated with the web-based form with the user profile data may include mapping the one or more fields associated with the web-based form with the user profile data by the form filing module. The method 400 further includes filling the web-based form upon mapping using a fuzzy logic cognitive mapping technique in step 500. In one embodiment, filling the web-based form may include filling the web-based form by the form filing module.

The method 400 further includes making one or more server calls to the e-commerce website from at least one of the servers or a browser in one click based on filled we-based form to complete a checkout process in step 510. In one embodiment, making one or more server calls to the e-commerce website may include making one or more server calls to the e-commerce website by a checkout processing module. In a specific embodiment, detecting one or more changes in a signature of the web-based form by logging one or more errors occurred during a form filling process performed by the form filling module. In such an embodiment, detecting one or more changes in a signature of the web-based form may include detecting one or more changes in a signature of the web-based form by a form correction module. In some embodiments, detecting the one or more changes in the signature of the web-based form may include correcting one or more logged errors based on heuristics rules to complete the form filling process. In such an embodiment, correcting one or more logged errors may include correcting one or more logged errors by the form correction module.

In one embodiment, the method 400 may include analyzing network traffic and network connectivity associated with the one or more e-commerce websites. In such an embodiment, analyzing network traffic and network connectivity may include analyzing network traffic and network connectivity by a network analysis module. In a specific embodiment, analyzing the network traffic and the network connectivity may include transiting the checkout process from the server to an intermediary sub-processing module in a user device when a delay in the network or the connectivity issue between the user device and the server analyzed by the network analysis module. In such an embodiment, transiting the checkout process from the server to an intermediary sub-processing module in a user device may include transiting the checkout process from the server to an intermediary sub-processing module in a user device by a checkout process transition module. In some embodiments, transiting the checkout process may include processing the checkout process related to the purchase product in the user device to overcome the delay in the network or the connectivity issue. In such an embodiment, processing the checkout process related to the purchase product in the user device may include processing the checkout process related to the purchase product in the user device by the checkout process transition module. In one embodiment, when the e-commerce website is down for certain period of time, the system may resubmit the order multiple times from the server side before giving up on such order. In case even after multiple attempts of resubmission fails, the system will notify the customer.

Various embodiments of the system and method for populating web-based form in one click and managing e-commerce checkout process as described above enables an intelligent, fully automated, client-based form filler that maps the fields of a web-based form by parsing visual page elements and complete the checkout process in one click either from the server or from a browser of the client device. In recognition of the above needs, the system provides an intelligent form-filler that does not require any prior mapping or examination of the forms. Client-side program code examines web pages and automatically fills in fields of forms contained in the form with the appropriate data from a user profile, without requiring prior mapping or examination of the form. The characteristics of the user input controls are input into a machine learning mechanism or process that was trained for the purpose of identifying the type of information that is supposed to be input into various user input controls. Consequently, the user input controls can be automatically filled in with previously stored information.

The system may help to decrease network traffic associated with one or more e-commerce transactions by transitioning from the server to the sub processing module of the user device such as a browser. In this way, a user may still be able to access the website during periods of high network traffic but may be presented with a different checkout procedure when completing an e-commerce transaction thereby increasing usability of the website and customer satisfaction during periods of high network traffic. Accordingly, the techniques may increase sales throughput via the website and improve customer satisfaction.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing subsystem" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for populating a web-based form and managing e-commerce checkout process comprising:
a user interface and an application programming interface (API) configured to enable communication with one or more e-commerce websites;
a processing subsystem hosted on a server, wherein the server comprises a processor and a memory operatively coupled to a bus and wherein the memory comprises a set of program instructions in the form of a plurality of modules, configured to be executed by the processor, wherein the plurality of modules comprising:
a data collection module configured to:
collect a signature corresponding to one or more web-based forms from the one or more e-commerce websites;
collect product information, user profile data and one or more user preferences corresponding to the product to be purchased;
a change detection module configured to detect one or more changes in the signature of the one or more web-based forms by continuously monitoring the corresponding one or more e-commerce websites using a web crawler;
a signature collection module configured to store signature collected by the data collection module and changed signature detected by the change detection module to produce one or more aggregated fields;
a parsing and mapping module configured to:
parse artifacts and cookies of one or more fields corresponding to a web-based form located on an e-commerce web site based on a user preference using the one or more aggregated fields;
map the one or more fields associated with the web-based form with the user profile data using a classifier data mapping process;
fill the web-based form upon mapping using a fuzzy logic cognitive mapping technique;
a checkout processing module configured to make one or more server calls to the e-commerce website from at least one of the server or a browser in one click based on filled web-based form to complete a checkout process.

2. The system of claim 1, where the data collection module is configured to add the product to cart and load a checkout page on behalf of the user.

3. The system of claim 1, wherein the processing subsystem comprises a form correction module which is configured to detect one or more changes in a signature of the web based form by logging one or more errors occurred during a form filling process performed by the form filling module.

4. The system of claim 3, wherein the form correction module is configured to correct one or more logged errors based on heuristics rules to complete the form filling process.

5. The system of claim 1, wherein the processing subsystem comprises a network analysis module configured to analyze network traffic and network connectivity associated with the one or more e-commerce websites.

6. The system of claim 5, wherein the processing subsystem comprises a checkout process transition module configured to transit the checkout process from the server to an intermediary sub-processing module in a user device when a delay in the network or the connectivity issue is analyzed between the user device and the server.

7. The system of claim 6, wherein the checkout process transition module is configured to process the checkout process related to the purchase product in the user device to overcome the delay in the network or the connectivity issue.

8. The system of claim 1, wherein the database is configured to store form Hypertext Markup Language (HTML) without personally identifiable information (PII).

9. The system of claim 1, wherein the form filling process is performed on a client server through the browser or an application, wherein the browser or the application visits the e-commerce webpage through the network.

10. The system of claim 1, wherein the parsing and mapping module is configured to trigger the order based on one or more available application programming interfaces (APIs).

11. A method comprising:
  enabling, by a user interface and an application programming interface (API), communication with one or more e-commerce websites;
  executing, by a processing subsystem hosted on a server, on a network to control bidirectional communications among a plurality of modules;
  collecting, by a data collection module, a signature corresponding to one or more web-based forms from the one or more e-commerce websites;
  collecting, by the data collection module, product information, user profile data and one or more user preferences corresponding to the product to be purchased;
  performing user authentication, by a user authentication module, to ensure that the user profile is accessed only by the authorized user using biometric or other forms of secure authentication mechanism;
  detecting, by a change detection module, one or more changes in the signature of the one or more web-based forms by continuously monitoring the corresponding one or more e-commerce websites using a web crawler;
  storing, by a signature collection module, signature collected by the data collection module and changed signature detected by the change detection module to produce one or more aggregated fields;
  parsing, by a parsing and mapping module, artifacts and cookies of one or more fields corresponding to a web-based form located on an e-commerce web site based on a user preference using the one or more aggregated fields;
  mapping, by the parsing and mapping module, the one or more fields associated with the web-based form with the user profile data using a classifier data mapping process;
  filling, by the parsing and mapping module, the web-based form upon mapping using a fuzzy logic cognitive mapping technique; and
  making, by a checkout processing module, one or more server calls to the e-commerce web site from at least one of the server or a browser in one click based on filled we-based form to complete a checkout process.

12. The method of claim 11, comprising detecting, by a form correction module, one or more changes in a signature of the web based form by logging one or more errors occurred during a form filling process performed by the form filling module.

13. The method of claim 12, wherein detecting the one or more changes in the signature of the web based form comprises correcting, by the form correction module, one or more logged errors based on heuristics rules to complete the form filling process.

14. The method of claim 11, comprising analyzing, by a network analysis module, network traffic and network connectivity associated with the one or more e-commerce websites.

15. The method of claim 14, wherein the network analysis module is configured to enable the checkout processing module to resubmit the order in a plurality of attempts when the e-commerce website is down for a period of time and send a notification to the user when the resubmission fails after the plurality of attempts.

16. The method of claim 14, wherein analyzing the network traffic and the network connectivity comprises transiting, by a checkout process transition module, the checkout process from the server to an intermediary sub-processing module in a user device when a delay in the network or the connectivity issue between the user device and the server analyzed by the network analysis module.

17. The method of claim 16, wherein transiting the checkout process comprises processing, by the checkout process transition module, the checkout process related to the purchase product in the user device to overcome the delay in the network or the connectivity issue.

* * * * *

UNITED STATES PATENT AND TRADEMARK OFFICE
CERTIFICATE OF CORRECTION

Page 1 of 1

PATENT NO. : 11,532,031 B2
APPLICATION NO. : 17/144178
DATED : December 20, 2022
INVENTOR(S) : Kumar N. Senthil et al.

It is certified that error appears in the above-identified patent and that said Letters Patent is hereby corrected as shown below:

On the Title Page

Item (12) delete "Senthil" and insert -- Senthil et al. --.

Item (72) Please add Stella Rowlett, Redmond, WA (US) as second Inventor.

Signed and Sealed this
Twenty-fourth Day of January, 2023

Katherine Kelly Vidal
*Director of the United States Patent and Trademark Office*